US011625933B2

(12) United States Patent
Patil et al.

(10) Patent No.: US 11,625,933 B2
(45) Date of Patent: Apr. 11, 2023

(54) IDENTIFYING INVALID IDENTIFICATION DOCUMENTS

(71) Applicant: Capital One Services, LLC, McLean, VA (US)

(72) Inventors: Swapnil Patil, Vienna, VA (US); Jason Pribble, McLean, VA (US); Daniel Alan Jarvis, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/314,248

(22) Filed: May 7, 2021

(65) Prior Publication Data

US 2022/0358312 A1    Nov. 10, 2022

(51) Int. Cl.
 *G06K 9/00* (2022.01)
 *G06V 30/413* (2022.01)
 *G06T 7/50* (2017.01)
 *G06V 30/148* (2022.01)

(52) U.S. Cl.
 CPC ............. *G06V 30/413* (2022.01); *G06T 7/50* (2017.01); *G06V 30/153* (2022.01); *G06T 2207/10028* (2013.01)

(58) Field of Classification Search
 CPC ...... G06V 30/413; G06V 30/153; G06T 7/50; G06T 2207/10028
 See application file for complete search history.

(56) References Cited

U.S. PATENT DOCUMENTS

| | | | |
|---|---|---|---|
| 8,243,345 B2 * | 8/2012 | Kim | H04N 1/1017 250/237 R |
| 10,281,506 B2 * | 5/2019 | Minezawa | G01R 19/0092 |
| 10,679,050 B2 | 6/2020 | Eapen | |
| 2013/0124120 A1 * | 5/2013 | Maruyama | G16Z 99/00 702/60 |
| 2017/0287252 A1 * | 10/2017 | Laddha | G06V 10/44 |
| 2020/0234309 A1 | 7/2020 | Arora et al. | |
| 2021/0075788 A1 * | 3/2021 | Pasterk | G06F 16/532 |

FOREIGN PATENT DOCUMENTS

| | | |
|---|---|---|
| JP | 2000011147 A | 1/2000 |
| JP | 2009292112 A | 12/2009 |

\* cited by examiner

*Primary Examiner* — Gregory M Desire
(74) *Attorney, Agent, or Firm* — Sterne, Kessler, Goldstein & Fox P.L.L.C.

(57) ABSTRACT

The method, system, and non-transitory computer-readable medium embodiments described herein provide for identifying invalid identification documents. In various embodiments, an application executing on a user device prompts the user device to transmit an image of the identification document. The application receives an image including the identification document in response to the identification document being within a field of view of a camera of the user device. The identification document includes a plurality of visual elements, and one or more visual elements of the plurality of visual elements are one or more invalidating marks. The application detects a predetermined pattern on the identification document in the image, the predetermined pattern formed from the one or more invalidating marks. The application determines that the identification document is invalid based on the detected predetermined pattern.

20 Claims, 12 Drawing Sheets

IDENTIFYING INVALID IDENTIFICATION DOCUMENTS

TECHNICAL FIELD

The present disclosure is in the technical field of authenticating identification documents using image analysis.

BACKGROUND

Issuers of identification documents often place an invalidating mark on a void (e.g., invalid, suspended, or expired) identification document. The invalidating mark may be a predetermined pattern, such as text, a pattern, or the like. The invalidating mark indicates that the identification document is invalid and should not be accepted.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for updating and validating data stored in a database.

Entities, such as financial institutions, government agencies, educational institutions, corporations may allow users to execute transactions using their website or mobile applications. These transactions may require identity verification. As a result, the entities allow the users to submit an image of their identification document via the website or mobile application. However, users have been able to manipulate the system by providing images of invalid or voided identification documents. The websites or mobile applications may fail to determine whether the identification document is void or invalid based on the image of the identification document. As a result, users may submit void or invalid identification documents to execute the transactions.

Embodiments described herein solve this problem by identifying a predetermined pattern on the identification document that indicates the identification document is invalid. In various embodiments, an application executing on a user device, e.g., a cell phone, laptop, desktop, etc., prompts the user device to transmit an image of the identification document. The application receives an image including the identification document in response to the identification document being within a field of view of a camera of the user device. The identification document includes a plurality of visual elements, and one or more visual elements of the plurality of visual elements are one or more invalidating marks. The application detects the one or more invalidating marks on the identification document in the image. Next, the application detects that the one or more invalidating marks form a predetermined pattern on the identification document. The application determines that the identification document is invalid based on detecting that the invalidating marks form the predetermined pattern on the identification document.

The embodiments described herein allow for identifying a void or invalid identification document based on the predetermined pattern on the identification document. As described above, the predetermined pattern may be formed by one or more invalidating marks placed on the identification document by the issuer. This way, the application does not accept a void or invalid identification document and prevents any transaction from being executed by the user, requiring identification verification of the user. As a result, embodiments described herein prevent illegal and fraudulent activity.

Figure 1:
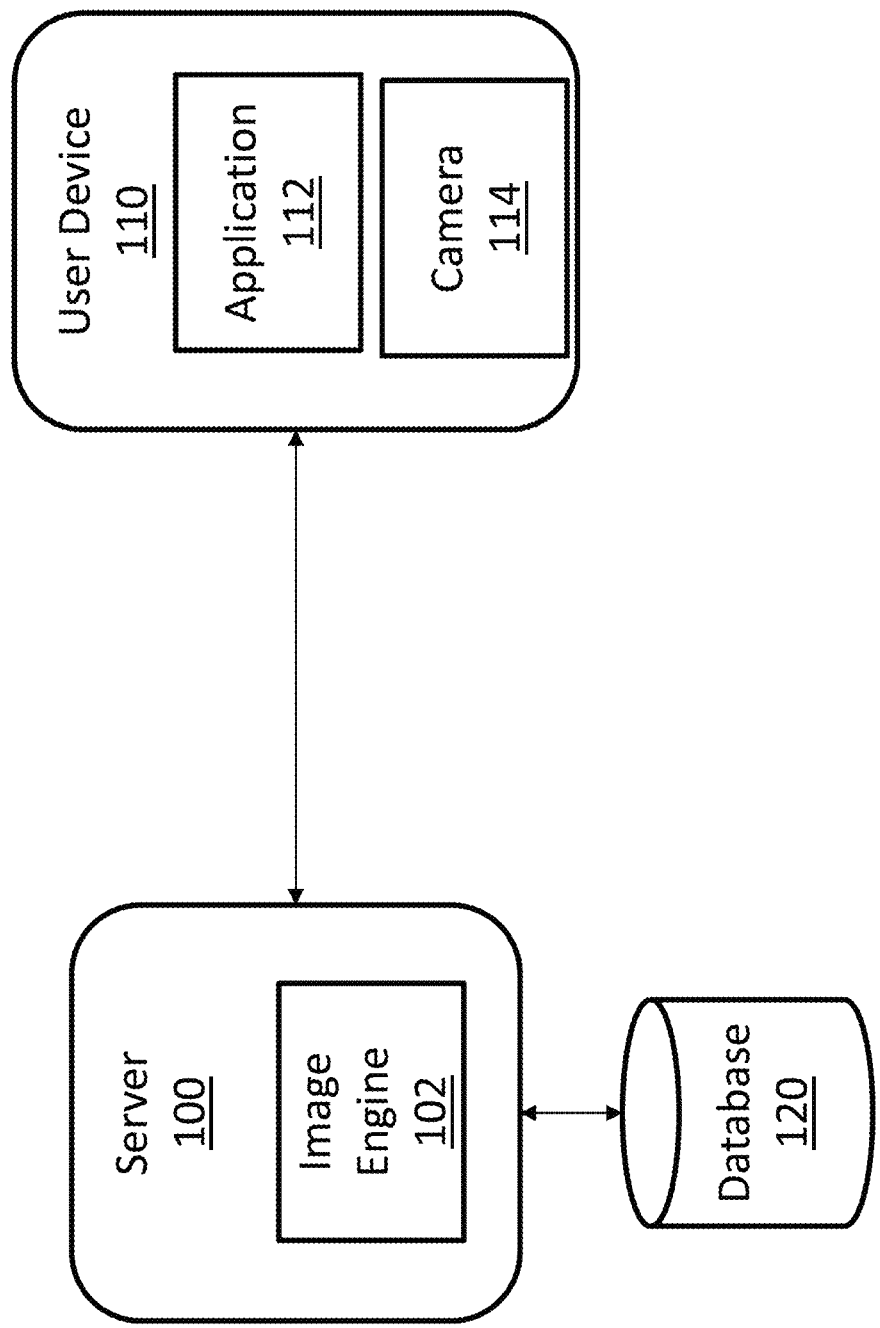
FIG. 1 is a block diagram of a system for identifying invalid identification documents, according to some embodiments.

FIG. 1 is a block diagram of a system for identifying invalid identification documents, according to some embodiments. In a variety of embodiments, the system can include a server 100, user device 110, and database 120. Server 100 may communicate with user device 110 and database 120.

The devices of the system for identifying invalid identification documents can be connected through wired connections, wireless connections, or a combination of wired and wireless connections. As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In various embodiments, user device 110 may execute application 112. Application 112 may be associated with an entity such as a financial institution, government agency, educational institution, corporation, etc. A user may use application 112 to execute transactions associated with the entity. One or more of the transactions may require identity verification. Furthermore, registering on the application may also require identity verification. As a result, application 112 may verify the user's identification based on an image of the user's identification document. The identification document may include but is not limited to a driver's license, passport, employee badge, school ID, etc. The identification document may include visual elements. The visual elements may include text, images, colors, markings, invalidating marks, etc. For example, the visual elements may include the user's name, address, gender, date of birth, image, etc. The visual elements may also include a logo of the issuer (e.g., state, city, company, etc.), name of the issuer, holograms, etc.

Application 112 may determine whether the identification document is valid based on the image of the identification document. Issuers of the identification documents may place a predetermined pattern on an identification document if the identification document is void, expired, suspended, or invalid. The predetermined pattern may be made up of one or more of the visual elements. The one or more visual elements may be invalidating marks. The invalidating marks may include holes punched in the document, corners cut off the document, a stamp, a word printed on the document, etc. In various embodiments, the holes punched in the identification document may form a particular pattern, such as a word (e.g., "VOID" or "INVALID"). Application 112 may identify the predetermined pattern formed using the invalidating marks to determine whether an identification document is invalid. The determination of whether the identification document is valid will be described in further detail with respect to FIGS. 2-4.

User device 110 may also include a camera 114. However, any image capturing device may be used with user device 110. Camera 114 may be an image capturing device configured to capture still and/or moving images. Camera 114 may become operational in response to user device 110 launching application 112. Camera 114 may continuously transmit image frames to application 112 in response to becoming operational. The image frames may include objects in the field of view of camera 114. An image frame may be an image of the area within the field of view of camera 114. The image frame may be a live frame of the objects in the area within the field of view of camera 114.

The user may place an identification document within the field of view of camera 114. Camera 114 may continuously transmit image frames of the identification document to application 112. Application 112 may analyze each image frame to verify the image quality and validity of the identification document. Applicant 112 may do this independently of server 100 or in conjunction with server 100. Application 112 may provide (near) real-time feedback regarding the image quality and validity of the identification document. Once application 112 determines that the image quality of an image frame meets one or more predetermined conditions, and application 112 is able to verify the validity of the identification document in the image frame, application 112 may cause camera 114 to capture an image of the identification document automatically. In various embodiments, application 112 may prompt the user to provide an input to capture the image. The captured image of the identification document may be transmitted to server 100.

Server 100 may include image engine 102. Image engine 102 may receive the image of the identification document. Image engine 102 may be configured to analyze the image frame to verify the image quality and validity of the identification document. Image engine 102 may cause the display of a message indicating success or failure of validating the identification document on user device 110.

Database 120 may be one or more data storage devices. Database 120 may be configured to store predefined predetermined patterns, which indicate an identification document is expired, suspended, or invalid. The predefined predetermined patterns may be collected from various issuers of identification documents. The issuers may include but are not limited to government agencies, educational institutions, corporations, etc. Each issuer may use a different predetermined pattern to indicate that the identification document is expired, suspended, or invalid.

Figure 2:
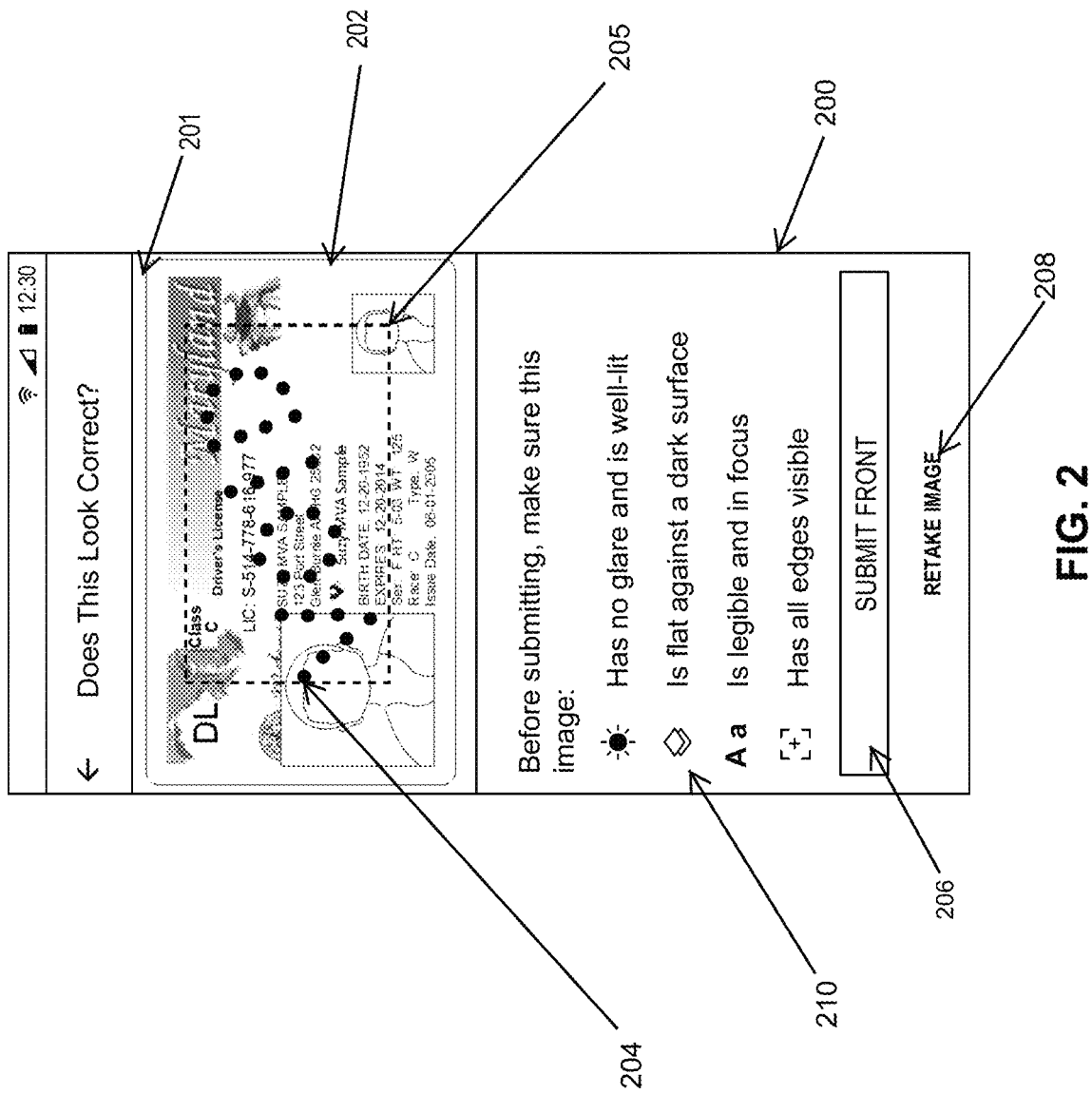
FIG. 2 illustrates a graphical user interface (GUI) used for submitting an image of identification documents, according to some embodiments.

FIG. 2 illustrates a graphical user interface (GUI) of an application used for submitting an image of an identification document. FIG. 2 shall be described with reference to FIG. 1; however, it is not limited to this embodiment. The GUI can take many forms is not limited to what is shown in FIG. 2.

In various embodiments, application 112 may be launched to execute transactions or view information associated with an entity (e.g., financial institution). This may require verification of a user's identification. As a result, application 112 may render graphical user interface (GUI) 200 on user device 110 to capture an image of the front and back of the user's identification document 202. In addition, GUI 200 may include a viewing area 201, submit selection 206, retake selection 208, and directions for capturing an image of identification document 210.

Camera 114 may become operational in response to user device 110 launching application 112. Once camera 114 is made to be operational, camera 114 may contemporaneously and continuously capture image frames of the area within the field of view of camera 114. The area within the field of view of camera 114 may be rendered in a viewing area 201 of GUI 200.

The user may place identification document 202 in the area within the field of view of camera 114, and identification document 202 may be rendered on GUI 200. As a non-limiting example, identification document 202 may be a driver's license issued by the state of Maryland. However, it can be appreciated that identification document 202 may be a passport, employee ID, school ID, or another identification document. FIG. 2 illustrates the front of identification document 202. The front or back of identification document 202 may include visual elements, including text, graphics, colors, markings, etc. The visual elements may also include invalidating marks.

Invalidating marks 204 may be placed on identification document 202 by the issuer of identification document 202 (e.g., the state of Maryland) to indicate that identification document 202 is void, suspended, expired, or invalid. Invalidating marks 204 may form a predetermined pattern 205, indicating that identification document 202 is void, suspended, expired, or invalid. As illustrated in FIG. 2, the invalidating marks 204 are holes punched in identification document 202. The holes punched in identification document 202 form the predetermined pattern. The predetermined pattern may be the word "VOID"; therefore, in this example, the holes punched in identification document 202 form the word "VOID" across the front of identification document 202.

Different issuers of identification documents may have different predetermined patterns to indicate that a given identification document is void, suspended, expired, or invalid. Therefore, different issuers may punch holes in the given identification document to form different patterns, words, or designs to indicate that the given identification document is void, suspended, expired, or invalid.

Camera 114 may continuously capture image frames of identification document 202 and transmit the image frames to application 112. Application 112 may analyze each image frame to determine the image quality of the image frame. Application 112 may require the image quality of the image frame to comply with certain criteria for capturing an image of identification document 210. For example, application 112 may require that the image frame has no glare, is well-lit, is flat against a dark surface, is legible and in-focus, and has all edges visible. Software associated with application 112 or camera 114 may provide instructions to the user to assist in capturing an image of identification document 210 satisfying these criteria.

Application 112 may also determine the validity of identification document 202 in each image frame. For example, application 112 may detect invalidating marks 204 on identification document 202. Specifically, application 112 may detect the holes in the identification document 202. The holes may be the same size and within a predetermined distance of each other. Application 112 may determine that the holes are positioned within the predetermined distance along the Y or X-axis. Furthermore, application 112 may determine that the holes are aligned within one another but are not aligned with the other visual elements on identification document 202. This is one way application 112 may determine the holes are invalidating marks 204.

In addition to or alternatively, application 112 may generate a depth map for a given image frame received from camera 114. The depth map may include information relating to the distance of the surfaces of scene objects from a viewpoint. Application 112 may determine that the holes (e.g., invalidating marks 204) punched in identification document 202 are of a different depth than the remainder of the visual elements on identification document 202 based on the depth map. This is another way application 112 may identify the holes that are invalidating marks.

In addition to or alternatively, application 112 may detect the holes in identification document 202 based on the shadows cast by the holes on the surface of identification document 202. For example, based on the depths of the holes, the holes may cast a shadow on the surface of identification document 202. Application 112 may detect the shadow, and based on the detected shadow, detect the holes. This is yet another way application 112 may identify the holes that are invalidating marks.

In addition to or alternatively, application 112 may use circle Hough Transform (CHT) to detect the holes in identification document 202 in the image frame. CHT is a feature extraction technique used to detect circles in images. CHT may be used to detect circles in images. Application 112 may use OPENCV to implement CHT.

In response to detecting the holes, application 112 may dilate the image frame. Dilation of the image frame may involve expanding the pixels of the image frame. Furthermore, to dilate the image frame, application 112 may add pixels to the boundaries of the objects in the image frame. Dilation increases the sizes of objects in the image frame, filling in holes and broken areas and connecting areas that are separated by spaces. As a result, dilating the image frame may cause the holes to blur together and form solid lines. Therefore, the dilated image frame may render the predetermined pattern "VOID" as if it were written in solid lines. As a non-limiting example, application 112 may use OPENCV to dilate the image frame.

Application 112 may execute optical character recognition (OCR) to identify the letters "V" "O" "I" and "D" in the dilated image. OCR is the conversion of images of typed, handwritten, or printed text into machine-encoded text. In response to identifying the letters "V" "O" "I" and "D", application 112 may determine the holes form the predetermined pattern "VOID".

Application 112 may query database 120 to retrieve predetermined patterns used to indicate identification documents that are void, suspended, or invalid. Application 112 may match at least one predetermined pattern retrieved from database 120 with the word "VOID" identified on identification document 202. Application 112 may determine that identification document 202 is invalid, expired, void, or suspended based on successfully matching the at least one predetermined pattern retrieved from database 120 with the word "VOID" identified on identification document 202.

In various embodiments, application 112 may prevent the user from capturing and transmitting an image of identification document 202 in response to determining that identification document 202 is invalid, expired, void, or suspended. Application 112 may prevent the user from performing transactions or viewing information using application 112 based on failing to verify identification document 202. In some embodiments, application 112 may allow the user to capture and transmit the image frame, including identification document 202, even if application 112 determines that identification document 202 is invalid, expired, void, or suspended so that image engine 102 may confirm the invalidity of identification document 202.

A user may select submit selection 206 to capture the image of identification document 202. In response to the user selecting submit selection 206, camera 114 may capture the image of identification document 202 and transmit the image to server 100. Submit selection 206 may be for submitting an image of the front side of identification document 202. In response to submitting the image of the front side of identification document 202, GUI 200 may prompt the user to capture an image of the backside of identification document 202. Application 112 may analyze the backside of identification document 202 to verify the image quality and validity of identification document 202.

In response to capturing the image of the front side of identification document 202, application 112 may render the image in viewing area 201. A user may retake the image by selecting retake image selection 208.

In various embodiments, camera 114 may automatically capture the image of identification document 202 in response to application 112 verifying the image quality of a given image frame. In some embodiments, camera 114 may automatically capture the image of identification document 202 in response to application 112 verifying the image quality of a given image frame and the validity of identification document 202.

Server 100 may receive the front side and backside images of identification document 202. Image engine 102 may verify the image quality and validity of identification document 202 based on the images in the same fashion as with respect to application 112. In response to failing to verify the image quality or validity of identification document 202, image engine 102 may cause application 112 to render a message indicating that identification document 202 could not be verified. Image engine 102 may prevent the user from performing transactions or viewing information using application 112 based on failing to verify identification document 202.

The example embodiment illustrated in FIG. 2 shows invalidating marks 204 as holes in identification document 202. However, invalidating marks 204 may be embodied as other visual elements, such as text, stamps, cut corners, or a dot matrix. In one example, the text may be written in infrared ink, thus requiring camera 114 to be configured to detect such writings in the infrared range.

In one example, invalidating marks 204 may be text printed or stamped on identification document 202. Application 112 may detect the text printed or stamped on identification document 202 based on the different font of the text or stamp compared to the other visual elements on identification document 202. Application 112 may also detect the text or stamp based on the text or stamp not being aligned with the other visual elements on identification document 202. Application 112 or image engine 102 may use OCR to identify the text printed or stamped on identification document 202. Application 112 or image engine 102 may match the text printed or stamped identification document 202 with a predetermined pattern stored in database 120.

In another example, invalidating marks 204 may be one or more corners cut off identification document 202. Application 112 or image engine 102 may detect the shape of the edges of identification document 202 and determine that the issuer has cut off the corners of identification document 202. Application 112 or image engine 102 may match the shape of the corners with a predetermined pattern stored in database 120.

In yet another example, invalidating marks 204 may be a dot-matrix printed on identification document 202 in a predefined pattern. A dot matrix is a pattern formed by a series of dots printed on identification document 202. The dots may be the same size and within a predetermined distance of one another. Application 112 or image engine 102 may determine that the dots are positioned within the predetermined distance along the Y or X-axis. Furthermore, application 112 may determine that the dots are aligned within one another but are not aligned with the other visual elements on identification document 202. This way, application 112 may determine the dots are invalidating marks 204. Application 112 or image engine 102 may detect the dots the same way application 112 detects the holes, as described above. Application 112 or image engine 102 may dilate the image of identification document 202 so that the dots blur together as solid lines. Application 112 or image engine 102 may identify the pattern formed by the dot matrix from the dilated image. Application 112 or image engine 102 may match the identified pattern on the identification document 202 with a predetermined pattern stored in database 120. As a non-limiting example, the identified pattern may be a word spelled out using dots (e.g., VOID).

FIGS. 3A-3F illustrate a graphical user interface (GUI) for providing real-time feedback regarding the image quality of a given image frame and validity of an identification document, according to some embodiments. FIGS. 3A-3F shall be described with reference to FIG. 1; however, it is not limited to this embodiment.

Figure 3A:
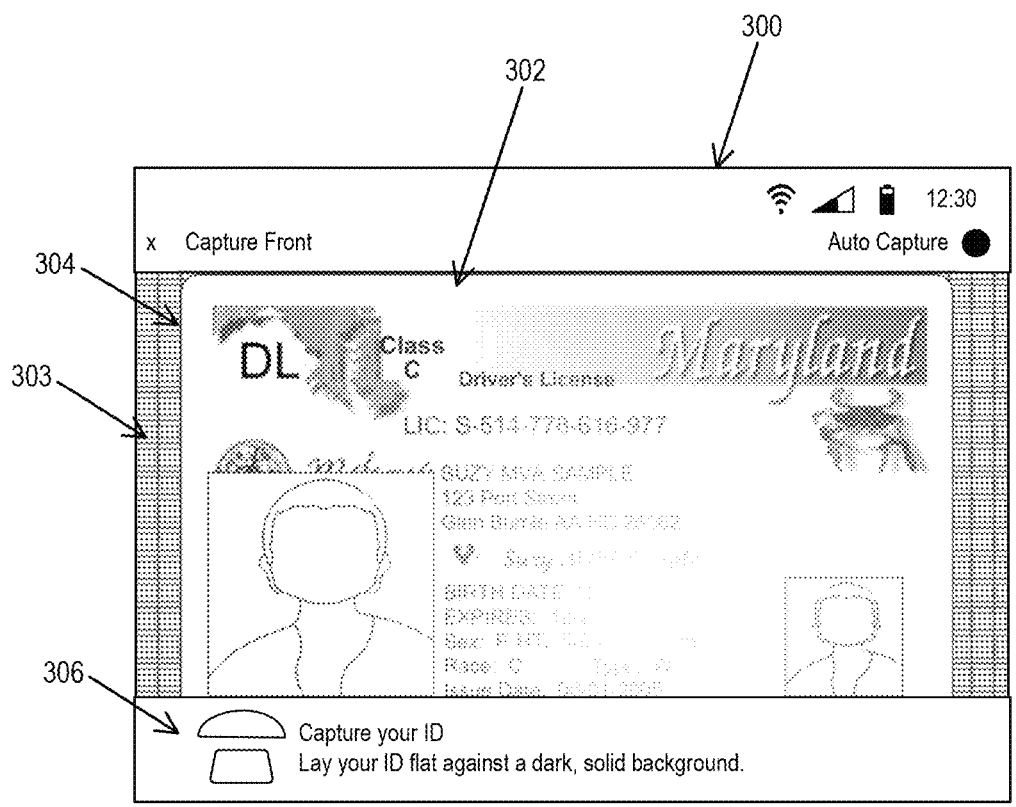
FIGS. 3A-3F illustrate a graphical user interface (GUI) for providing real-time feedback regarding the image quality of a given image frame and validity of an identification document, according to some embodiments.
Figure 3B:
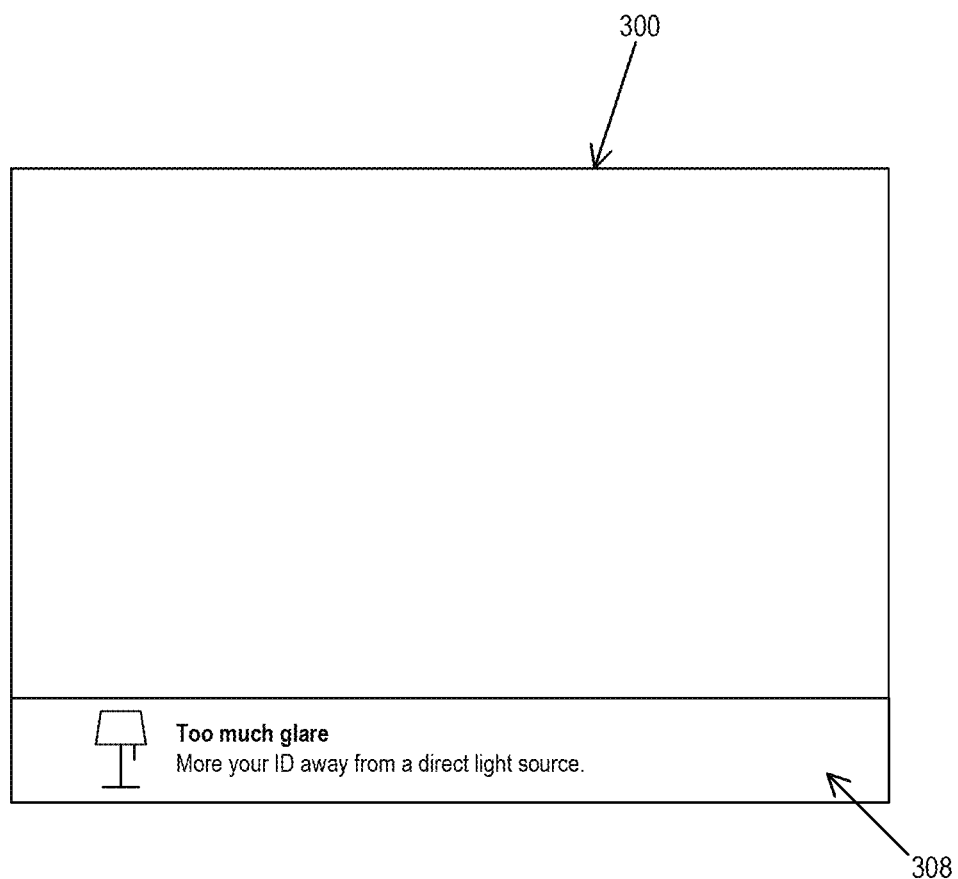

With respect to FIG. 3A, in various embodiments, application 112 may provide real-time feedback regarding the image quality of a given image frame and validity of an identification document in the given image frame using graphical user interface (GUI) 300. It may be important to capture an image at the correct image quality so that application 112 or image engine 102 may decipher and verify the visual elements on a given identification document. Application 112 may verify the image quality and validity of the identification document before the image is captured and transmitted to the server. This way, application 112 may verify the image quality and validity of the identification document in (near) real-time.

GUI 300 may include viewing area 303. Once camera 114 is made to be operational, camera 114 can continuously capture image frames of the area within the field of view of camera 114. The area within the field of view of camera 114 may be rendered in a viewing area 303 of GUI 300 prior to image capture. Application 112 may prompt the user to capture an image of a front side 302 and/or backside 310 of their identification document. GUI 300 may further include directions 306 for capturing the image of the identification document.

For example, application 112 may determine the outline of a front side 302 and overlay a boundary box 304 around the edges of front side 302 of the image, as rendered on the viewing area 303. Boundary box 304 may move as the first object moves within the field of view of the camera or as the camera 114 itself moves. The size of boundary box 304 may be determined based on the size of the identification document.

Camera 114 may transmit an image frame, including front side 302, to application 112. Application 112 may analyze the image quality of the image frame. For example, application 112 may determine whether the image frame has glare, is well-lit, is flat against a dark surface, is legible and in-focus, and has all edges visible. Application 112 may determine that the image frame has too much glare. Application 112 may be unable to decipher the visual elements on front side 302 because of the glare With respect to FIG. 3B, application 112 may cause display of message 308 on GUI 300, indicating that the image frame has too much glare. Message 308 may also indicate a recommended action to reduce the amount of glare. For example, message 308 may instruct the user to move the identification document away from a direct light source to reduce the glare.

Figure 3C:
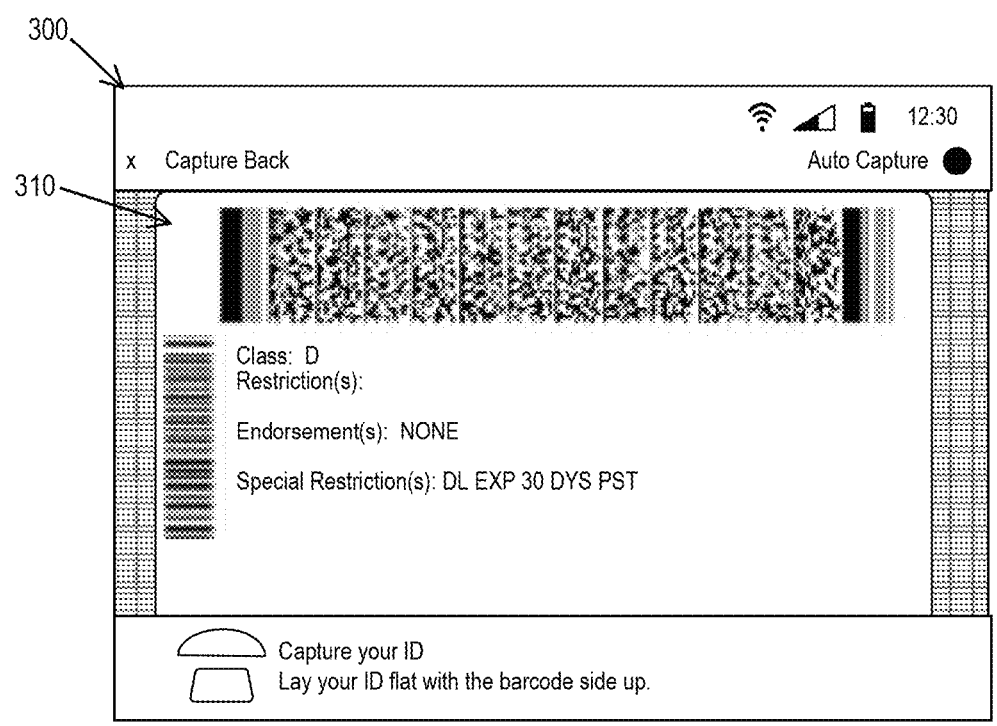

With respect to FIG. 3C, GUI 300 may prompt the user to capture an image of backside 310 of the identification document. Application 112 may analyze the image quality of an image frame including backside 310 of the identification document using the same processes as described above with respect to front side 302. Application 112 may determine that a distance between the backside 310 and camera 114 is greater than a threshold amount. In particular, application 112 may determine that the size of the identification document as it appears in the image frame is too small, and application 112 may be unable to decipher the visual elements on backside 310.

Figure 3D:
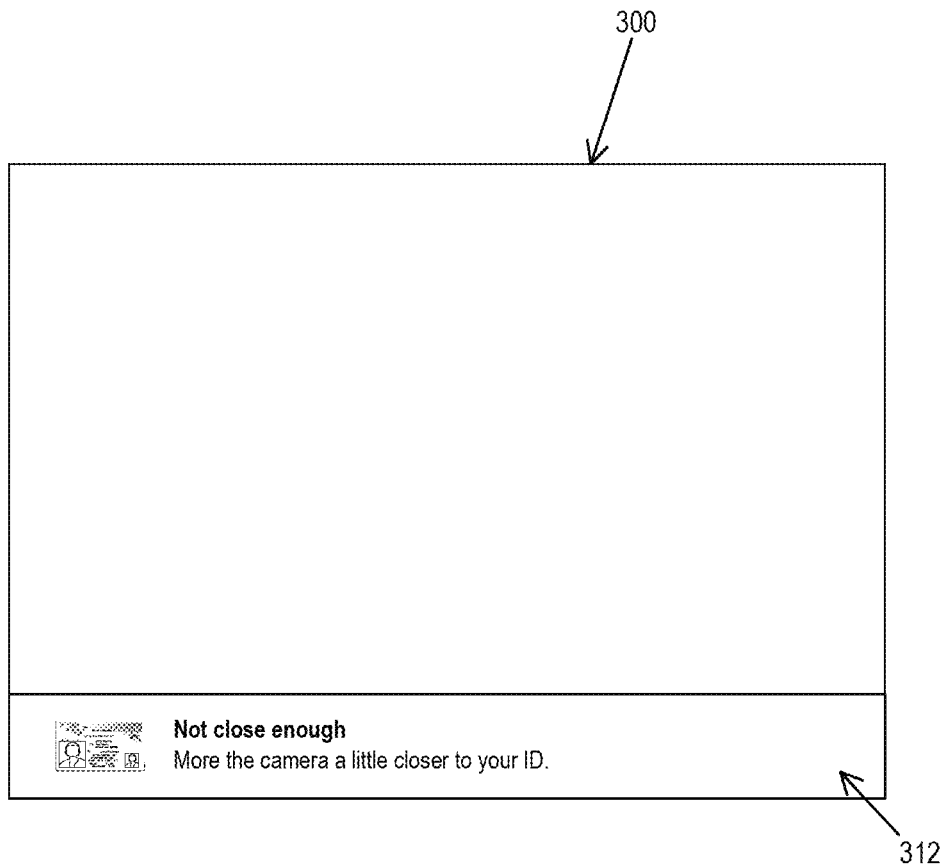

With respect to FIG. 3D, application 112 may cause display of message 312 on GUI 300, indicating that the distance between the identification document and camera 114 greater than a threshold amount. Message 312 may also indicate a recommended action to reduce the distance. For example, message 312 may instruct the user to move camera 114 closer to the identification document.

Figure 3E:
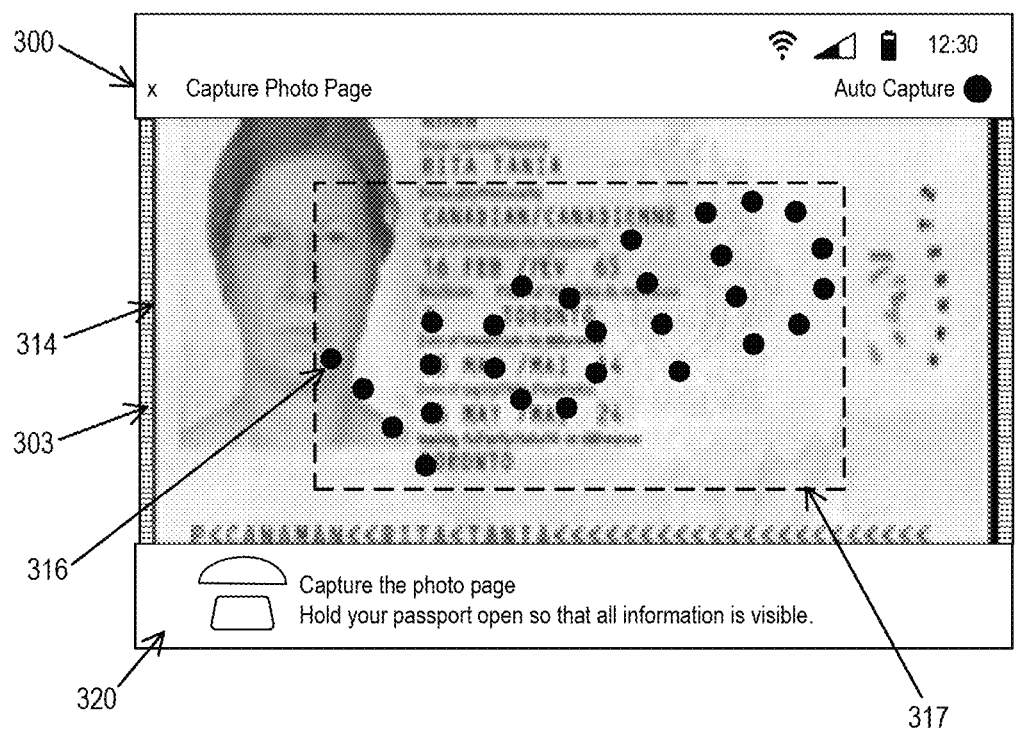

With respect to FIG. 3E, application 112 may also determine the validity of the identification document in (near) real-time. GUI 300 may include directions 320 for capturing the image of identification document 314. A user may place identification document 314 in the area within the field of view of camera 114 based on directions 320, such that the photo page of identification document 314 is rendered in viewing area 303.

Identification document 314 may be void, suspended, expired, or invalid. Identification document 314 may be a passport. Application 112 may determine identification document 314 is void, suspended, expired, or invalid, as described with respect to FIG. 2.

Figure 3F:
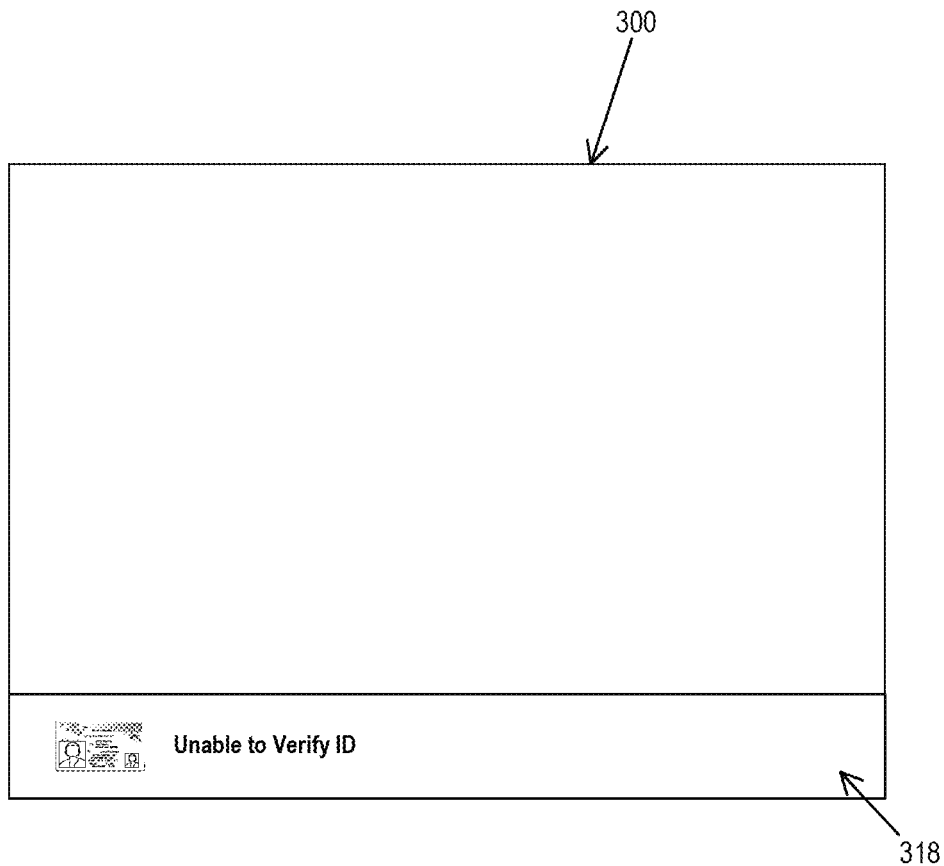

With respect to FIG. 3F, application 112 may cause a display of message 318 on GUI 300, indicating that application 112 failed to verify identification document 314 in (near) real-time.

Figure 4:
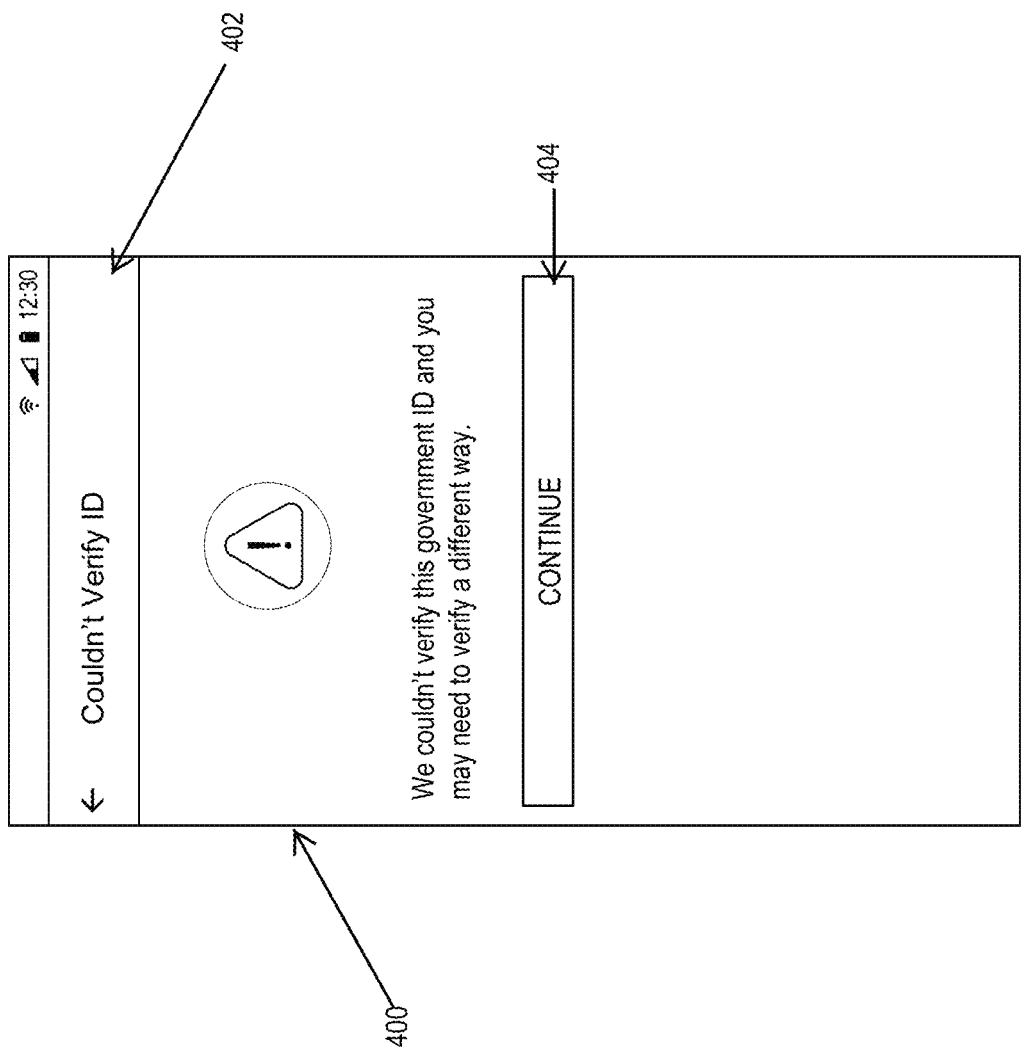
FIG. 4 illustrates a graphical user interface (GUI) including a message indicating that the identification document could not be verified, according to some embodiments.

FIG. 4 illustrates a graphical user interface (GUI) including a message indicating that the identification document could not be verified, according to some embodiments. FIG. 4 shall be described with reference to FIG. 1; however, it is not limited to this embodiment.

As described with respects to FIGS. 1-3, application 112 or image engine 102 may determine that an identification document is void, suspended, expired, or invalid. In response to application 112 or image engine 102 failing to verify an identification document, application 112 may render graphical user interface (GUI) 400. GUI 400 may include a message 402 that the identification document could not be verified.

GUI 400 may also include a recommended action, indicating the user may need to attempt to verify their identity using a different identification document. GUI 400 may also include selection 404 to allow users to try a different identification document for identification verification. In response to selecting selection 404, application 112 may return to GUI 200, as shown in FIG. 2, or GUI 300, as shown in FIG. 3.

Figure 5:
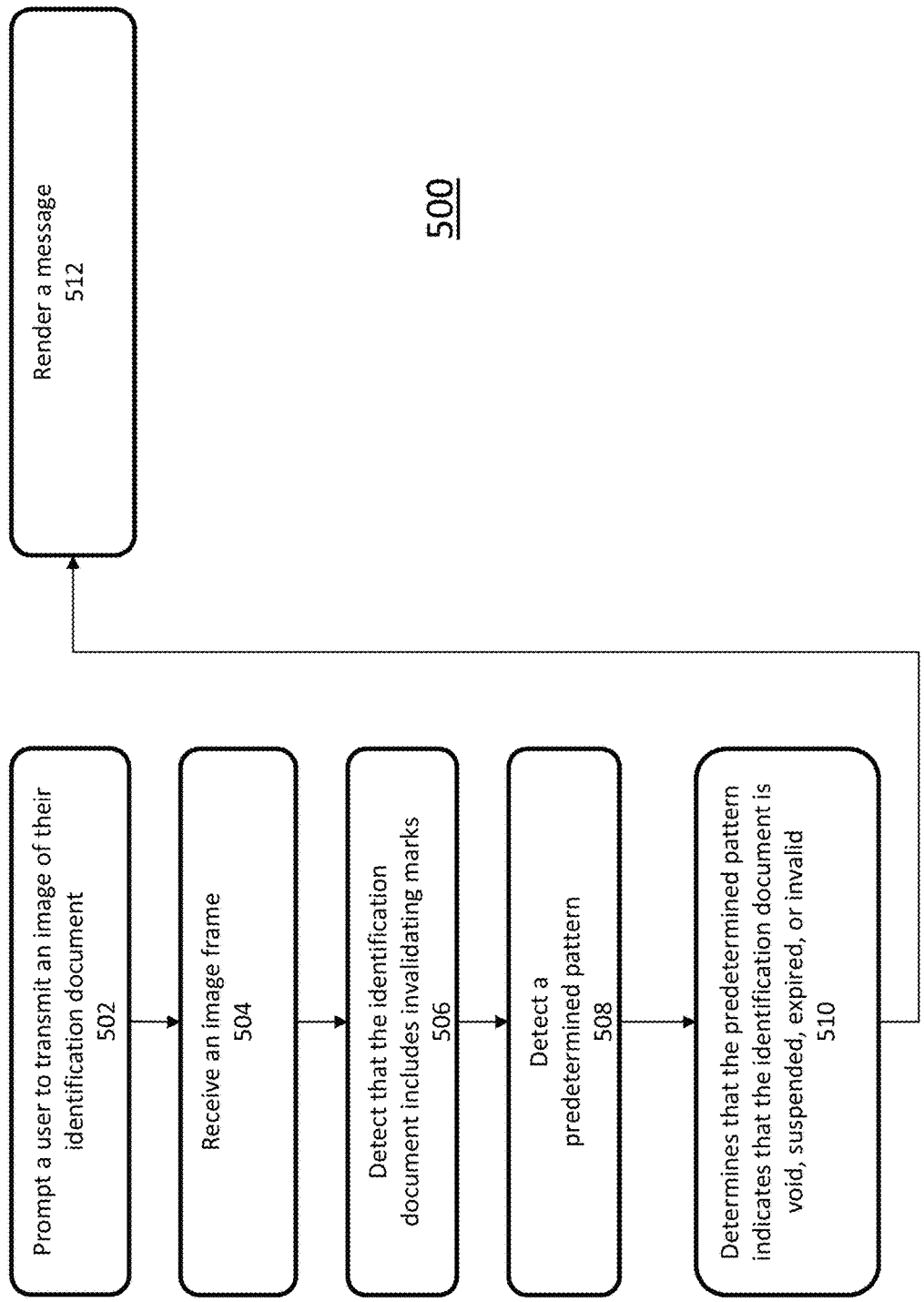
FIG. 5 is a flowchart illustrating a process for identifying an invalid identification document, according to some embodiments.

FIG. 5 is a flowchart illustrating a process for identifying an invalid identification document, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art. Method 500 shall be described with reference to FIG. 1. However, method 500 is not limited to those example embodiments.

In operation 502, application 112 of user device 110 prompts a user to transmit an image of their identification document. Application 112 may prompt the user to transmit an image of the front side and backside of the identification document. The front side and backside of the identification document may include visual elements, such as text, graphics, markings, etc. The visual elements may also include invalidation marks. An issuer of the identification document may place the invalidating marks on the identification document to indicate that the identification document is void, suspended, expired, or invalid. Once camera 114 is made to be operational, camera 114 may continuously capture image frames of the identification document.

In operation 504, application 112 receives an image frame, including the identification document, in response to the identification document being within a field of view of a camera of the user device. The image frame may include the front side or backside of the identification document. The invalidating marks may be on the front and/or backside of the identification document.

In operation 506, application 112 detects that the identification document includes invalidating marks. For example, the invalidating marks may include holes in the identification document, a dot matrix, text or stamp on the identification document, cut corners of the identification document, and/or any other mark. Application 112 may detect the invalidating marks on the identification document as rendered in the image frame.

In operation 508, application 112 detects a predetermined pattern formed by the invalidating marks on the identification document in the image. The predetermined pattern may be a word, pattern, or design formed by the invalidating marks, indicating the identification document is void, suspended, expired, or invalid. Each issuer may place a specific predetermined pattern on the identification document to indicate that the identification document is void, suspended, expired, or invalid.

In operation 510, application 112 determines that the predetermined pattern on the identification document indicates that the identification document is void, suspended, expired, or otherwise invalid. In various embodiments, application 112 may retrieve predetermined patterns used by different issuers from database 120. Application 112 may match the predetermined pattern on the identification document with the predetermined patterns retrieved from database 120. Application 112 may determine that the predetermined pattern on the identification document indicates that the identification document is void, suspended, expired, or invalid in response to matching the predetermined pattern on the identification document with at least one predetermined pattern retrieved from database 120.

In operation 512, application 112 renders a message for the user, indicating that application 112 could not verify the identification document. In various embodiments, application 112 may prevent the user device from capturing the image of the identification document in response to determining that the identification document is invalid. In some embodiments, application 112 may allow the user device to capture and transmit the image of the identification document to server 100 so that image engine 102 can confirm the invalidity of the identification document.

Figure 6:
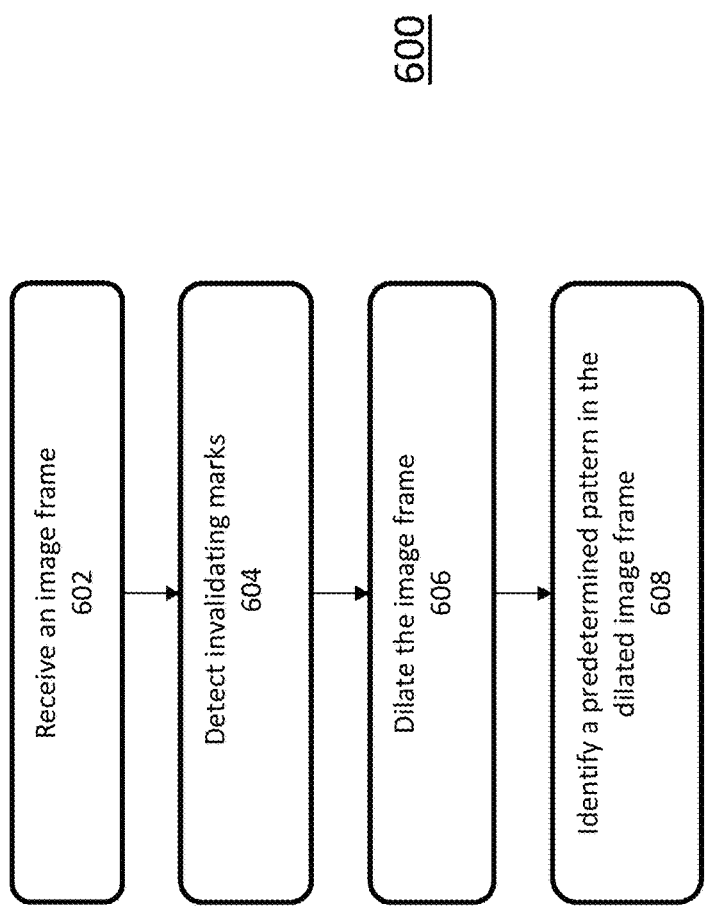
FIG. 6 is a flowchart illustrating a process for identifying a predetermined pattern on an identification document, according to some embodiments.

FIG. 6 is a flowchart illustrating a process for identifying a predetermined pattern on an identification document, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 6, as will be understood by a person of ordinary skill in the art. Method 600 shall be described with reference to FIG. 1. However, method 600 is not limited to those example embodiments.

In operation 602, application 112 receives an image frame from camera 114, including the identification document, in response to the identification document being within a field of view of camera 114 of user device 110. The identification document may include one or more invalidating marks. The invalidating marks may be holes that form a predetermined pattern, such as a word, pattern, or design. The holes may be of the same size and within a predetermined distance from each other.

In operation 604, application 112 detects the invalidating marks on the identification document in the image frame. Application 112 may detect the visual elements on the identification document, including the invalidating marks. As indicated above, the invalidating marks may be holes. Application 112 may determine that the holes are invalidating marks as the holes may not be aligned with the other visual elements. In addition to or alternatively, application 112 may determine the holes are invalidating marks based on the holes being the same size as each other and being within a predetermined distance of one another. In addition to or alternatively, application 112 may detect the holes on the identification document based on the shadows cast by the holes in the identification document. In addition to or alternatively, application 112 may use CHT to detect the holes. In addition to or alternatively, application 112 may generate a depth map of the image frame to detect the holes in the identification document.

In operation 606, application 112 dilates the image frame. Dilation of the image may involve reducing the space between objects in the image frame. By dilating the image, the holes may be increased in size. Furthermore, by dilating the image, the holes in the identification document may blur together such that the holes form solid lines. As a result, the dilated image may render the predetermined pattern formed by the holes as if it were formed by solid lines.

In operation 608, application 112 identifies the predetermined pattern in the dilated image frame using OCR. As indicated above, the dilated image may render the predetermined pattern formed by the holes as if it were formed by solid lines. In the event the predetermined pattern is the word "VOID", application 112 may identify the letters "V" "O" "I" "D" using OCR.

Figure 7:
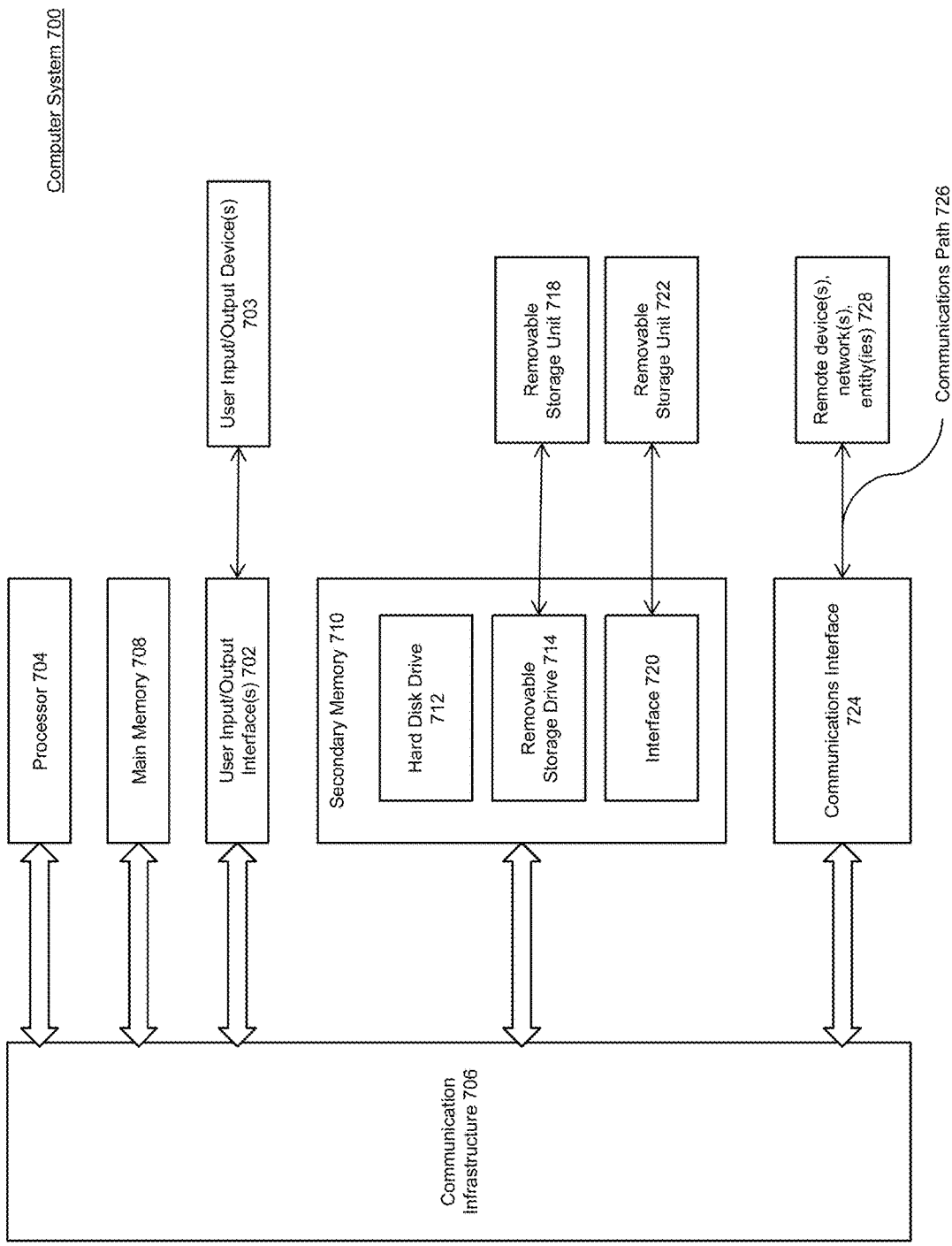
FIG. 7 is an example computer system useful for implementing various embodiments.

Various embodiments can be implemented, for example, using one or more computer systems, such as computer system 700 shown in FIG. 7. Computer system 700 can be used, for example, to implement methods 500 of FIG. 5 and 600 of FIG. 6. Furthermore, computer system 700 can be at least part of server 100, user device 110, and database 120, as shown in FIG. 1. For example, computer system 700 route communication to various applications. Computer system 700 can be any computer capable of performing the functions described herein.

Computer system 700 includes one or more processors (also called central processing units, or CPUs), such as a processor 704. Processor 704 is connected to a communication infrastructure or bus 706. One or more processors 704 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer database. Removable storage drive 714 reads from and/or writes to removable storage unit 718 in a well-known manner.

According to an exemplary embodiment, secondary memory 710 can include other means, instrumentalities, or other approaches for allowing computer programs and/or other instructions and/or data to be accessed by computer system 700. Such means, instrumentalities, or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In a variety of embodiments, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc., using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:

1. A method to validate an identification document, the method comprising:
    prompting, by a processor, a user device to transmit an image of the identification document;
    receiving, by the processor, the image including the identification document in response to the identification document being within a field of view of a camera of the user device, wherein the identification document includes a plurality of visual elements including a plurality of invalidating marks;
    detecting, by the processor, the plurality of invalidating marks on the identification document from the image;
    detecting, by the processor, the plurality of invalidating marks form a predetermined pattern on the identification document from the image; and
    determining, by the processor, that the identification document is invalid based on the detected predetermined pattern.

2. The method of claim 1, wherein the detected predetermined pattern is predetermined text formed from the plurality of invalidating marks on the identification document.

3. The method of claim 1, wherein the plurality of invalidating marks comprises a plurality of holes in the identification document.

4. The method of claim 3, further comprising:
    detecting, by the processor, the plurality of holes in the identification document based on a depth map of the image; and
    dilating, by the processor, the image such that the plurality of holes in the identification document form one or more solid lines; and
    identifying, by the processor, a pattern formed by the one or more solid lines using optical character recognition (OCR), wherein the predetermined pattern is detected based on identification of the pattern.

5. The method of claim 1, further comprising causing display, by the processor, of a message indicating the identification document is invalid on the user device.

6. The method of claim 1, wherein determining that the identification document is invalid is performed before the user device transmits the image including the identification document.

7. The method of claim 1, wherein determining that the identification document is invalid based on the detected predetermined pattern comprises matching, by the processor, the detected predetermined pattern with a predefined predetermined pattern that indicates invalidity of a respective identification document.

8. A system to validate an identification document, the system comprising:
    at least one memory; and
    at least one processor coupled to the at least one memory, the at least one processor configured to:
    prompt a user device to transmit an image of the identification document;
    receive the image including the identification document in response to the identification document being within a field of view of a camera of the user device, wherein the identification document includes a plurality of visual elements including a plurality of invalidating marks;
    detect the plurality of invalidating marks on the identification document from the image;
    detect the plurality of invalidating marks form a predetermined pattern on the identification document from the image; and
    determine that the identification document is invalid based on the detected predetermined pattern.

9. The system of claim 8, wherein the detected predetermined pattern is predetermined text formed from the plurality of invalidating marks on the identification document.

10. The system of claim 8, wherein the plurality of invalidating marks comprises a plurality of holes in the identification document.

11. The system of claim 10, wherein the processor is further configured to:
    detect the plurality of holes in the identification document based on a depth map of the image;
    dilate the image such that the plurality of holes in the identification document form one or more solid lines; and
    identify a pattern formed by the one or more solid lines using optical character recognition (OCR), wherein the predetermined pattern is detected based on identification of the pattern.

12. The system of claim 8, wherein the processor is further configured to display a message indicating the identification document is invalid on the user device.

13. The system of claim 8, wherein determining that the identification document is invalid is performed before the user device transmits the image including the identification document.

14. The system of claim 8, wherein determining that the identification document is invalid based on the detected predetermined pattern comprises matching the detected predetermined pattern with a predefined predetermined pattern which indicates invalidity of a respective identification document.

15. A non-transitory computer-readable medium having instructions stored thereon that, when executed by at least one computing device, cause the at least one computing device to perform operations, the operations comprising:
    prompting a user device to transmit an image of an identification document;
    receiving the image including the identification document in response to the identification document being within a field of view of a camera of the user device, wherein the identification document includes a plurality of visual elements including a plurality of invalidating marks;
    detecting the plurality of invalidating marks on the identification document from the image;

detecting the plurality of invalidating marks form a predetermined pattern on the identification document from the image; and determining that the identification document is invalid based on the detected predetermined pattern.

16. The non-transitory computer-readable medium of claim 15, wherein the detected predetermined pattern is predetermined text formed from the plurality of invalidating marks on the identification document.

17. The non-transitory computer-readable medium of claim 15, wherein the plurality of invalidating marks comprises a plurality of holes in the identification document.

18. The non-transitory computer-readable medium of claim 17, wherein the operations further comprise:

detecting the plurality of holes in the identification document based on a depth map of the image;

dilating the image such that the plurality of holes in the identification document form one or more solid lines; and identifying a pattern formed by the one or more solid lines using optical character recognition (OCR), wherein the predetermined pattern is detected based on identification of the pattern.

19. The non-transitory computer-readable medium of claim 15, wherein the operations further comprise displaying a message indicating the identification document is invalid on the user device.

20. The non-transitory computer-readable medium of claim 15, wherein determining that the identification document is invalid is performed before the user device transmits the image including the identification document.

\* \* \* \* \*